(12) United States Patent
Fan et al.

(10) Patent No.: US 11,568,703 B2
(45) Date of Patent: Jan. 31, 2023

(54) SYSTEMS AND METHODS FOR WIRELESS CHARGING STATIONS

(71) Applicant: Sichuan Energy Internet Research Institute, Tsinghua University, Sichuan (CN)

(72) Inventors: Jun Fan, Rolla, MO (US); Siming Pan, San Jose, CA (US); Dawei He, Burlingame, CA (US); Yi Liu, Chengdu (CN)

(73) Assignee: SICHUAN ENERGY INTERNET RES. INST., TSINGHUA UNIV., Chengdu (CN)

( * ) Notice: Subject to any disclaimer, the term of this patent is extended or adjusted under 35 U.S.C. 154(b) by 481 days.

(21) Appl. No.: 15/428,850

(22) Filed: Feb. 9, 2017

(65) Prior Publication Data
US 2017/0358168 A1    Dec. 14, 2017

Related U.S. Application Data

(60) Provisional application No. 62/347,243, filed on Jun. 8, 2016.

(51) Int. Cl.
| | |
|---|---|
| G07F 15/00 | (2006.01) |
| G06Q 20/10 | (2012.01) |
| G06Q 20/38 | (2012.01) |
| G06Q 30/02 | (2012.01) |
| G06Q 50/06 | (2012.01) |
| G06Q 20/02 | (2012.01) |

(52) U.S. Cl.
CPC .......... *G07F 15/005* (2013.01); *G06Q 20/02* (2013.01); *G06Q 20/10* (2013.01); *G06Q 20/3829* (2013.01); *G06Q 30/0202* (2013.01); *G06Q 30/0234* (2013.01); *G06Q 50/06* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 8,918,336 | B2 * | 12/2014 | Ferro | G06Q 50/30 705/34 |
| 2009/0313103 | A1 * | 12/2009 | Ambrosio | G07F 15/003 705/14.34 |
| 2009/0313104 | A1 * | 12/2009 | Hafner | B60L 53/305 705/14.25 |

(Continued)

FOREIGN PATENT DOCUMENTS

WO    WO-2013057587 A2 *    4/2013    ............. B60L 53/14

OTHER PUBLICATIONS

Antonopoulos, Andreas M., "Mastering Bitcoin", 2015, O'Reilly Media, Inc., First Edition, pp. 161-162 (Year: 2015).*

*Primary Examiner* — Neha Patel
*Assistant Examiner* — Clay C Lee

(57) ABSTRACT

Block chain based, decentralized transaction settlement systems and methods for wireless electric vehicle charging stations which enables real-time monitoring of electric vehicle charging demand for distribution system managers. The system is operable to enable easy implementation of rebate programs for electric vehicle owners, as well as charging station owners, and provides a secure, cost efficient, and transparent transaction settlement system using block chain software technology.

14 Claims, 5 Drawing Sheets

(56) References Cited

U.S. PATENT DOCUMENTS

| | | | |
|---|---|---|---|
| 2013/0031121 A1* | 1/2013 | Sera | G06Q 10/00 707/758 |
| 2015/0294329 A1* | 10/2015 | Saito | G06Q 30/0261 705/7.31 |
| 2016/0027229 A1* | 1/2016 | Spanos | G07C 13/00 705/51 |
| 2016/0092988 A1* | 3/2016 | Letourneau | G06Q 20/223 705/66 |
| 2017/0237944 A1* | 8/2017 | Haas | G06Q 20/14 348/143 |

* cited by examiner

SYSTEMS AND METHODS FOR WIRELESS CHARGING STATIONS

CROSS REFERENCE TO RELATED APPLICATION

The present application claims benefit of priority to U.S. Provisional Application No. 62/347,243, filed on Jun. 8, 2016, the entire contents of which are incorporated herein by reference.

TECHNICAL FIELD

The systems and methods described herein generally relate to transaction processing and reporting. Specifically, the present disclosure relates to utilizing block chain software technology in an enhanced settlement and information distribution network for electric vehicle charging stations within electricity distribution supply grids.

BACKGROUND

Wireless charging stations are expected to be a key component in electric vehicle networks. In particular, the charging information of electric vehicles is useful in the management of modern electricity distribution grids (e.g., smart grids) and in implementing subsidy rebate programs for owners of electric vehicles, as well as owners of electric vehicle charging stations. However, the modus operandi is such that all transactions in electric vehicle charging stations are settled in a centralized manner. Namely, transactions in wireless charging stations are settled through third-party transaction agents (e.g., banks, online transaction software) as has been traditionally been accomplished. In addition, the charging information of electric vehicles is either stored at, or discarded by such third-party transaction agents. As a consequence, electricity distribution network managers have little or no access to such information and are thereby in the dark when it comes to the operation and planning these electricity distribution networks. Additionally, subsidy rebate programs for electric vehicle owners and electric vehicle charging station owners cannot be efficiently implemented, since such subsidies need to be executed through the third-party transaction agents—a step that is very costly.

Therefore, a need exists for a transaction settlement system for wireless charging stations to enable a distributed, secure and transparent transaction settlement system for electric vehicle charging, without the need for a central coordinator. There also exists a need for a transaction settlement system for wireless charging stations in order to facilitate rebate programs for electric vehicle owners and charging station owners, as well as to create an effective management tool for distribution network operators to more effectively manage electricity supply grids.

SUMMARY

The disclosure herein relates to systems and methods for a decentralized settlement and information distribution network for electricity supply grids using block chain technology. The network is effectuated by communicatively coupling (e.g., through a distributed database system) each participant of the network with each other. All participants in the network may use the same block chain based transaction software, thereby allowing for transaction information to be verified and shared between all participants. The information is stored into a public ledger over the decentralized network without the need for a central authority or clearinghouse.

According to one aspect of the disclosure, a system is provided as a decentralized network of wireless charging stations coupled to any number of electricity distribution participants. The system will act to settle transactions and record their contents in a block chain ledger, accessible by all participants, thereby allowing real-time monitoring of electricity charging demand.

According to one aspect of the disclosure, a decentralized settlement and information distribution network for electricity supply grids is used to implement rebate programs for electrical vehicle owners, as well as electrical vehicle charging station owners.

These and other objects, features, and characteristics of the present disclosure, as well as the methods of operation and functions of the related components of structure and the combination of parts and economies of manufacture, will become more apparent upon consideration of the following description and the appended claims, with reference to the accompanying drawings, all of which form a part of this specification, wherein like reference numerals designate corresponding parts in the various figures. It is to be expressly understood, however, that the drawings are for the purpose of illustration and description only, and are not intended to limit the scope of this disclosure. As used in the specification and in the claims, the singular form of "a", "an", and "the" include plural referents unless the context clearly dictates otherwise.

DETAILED DESCRIPTION

The present disclosure describes systems and methods for enabling a fully distributed transaction settlement system for wireless charging stations, based on block chain software technology. This disclosure enables a secure and transparent transaction settlement scheme that is fully decentralized. Information is shared between all agents using a block chain software without a central coordinator. Moreover, this distributed transaction settlement scheme is robust against hacker attacks due to the application of the block-chain.

A block chain is an electronic, sequential structure of data which acts as a record or ledger of transactions that are electronically authenticated in a decentralized manner. Each verified transaction is represented by a "block" (i.e., a data structure) and contains with it data representing the transaction among other indications. Verification is done using cryptography which links verified blocks in succession via hash codes, thereby creating a unique "chain" with a high degree of security and accuracy, as well as a lower cost since it removes the need for a third-party verification and control.

A block chain based transaction settlement system for wireless charging stations enables a distributed, secure and transparent transaction settlement system for electric vehicle charging, without the need for a central coordinator. A block chain based transaction settlement system for wireless charging stations also can facilitate rebate programs for electric vehicle owners and charging station owners, as well as to create an effective management tool for distribution network operators to more effectively manage electricity supply grids. The systems and methods described herein may also be used to facilitate effective management of electric vehicle charging data for electricity distribution network operators. These and other features and advantages of the present disclosure will be further explained below and will be apparent to one skilled in the art without departing from the spirit and scope of the disclosure.

Figure 1:
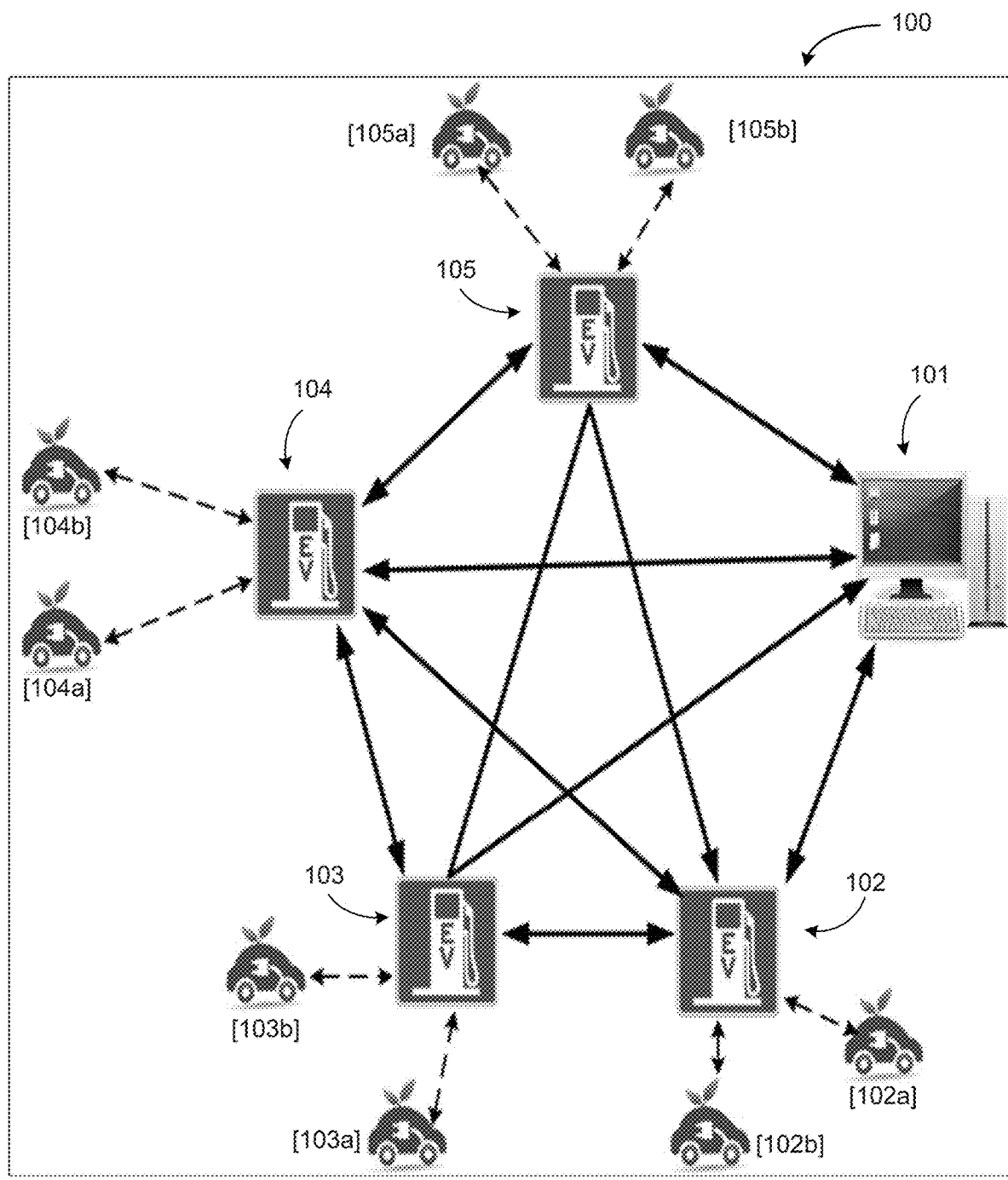
FIG. 1 depicts an exemplary network of electric vehicle charging stations and electricity system databases for carrying out aspects of the disclosure.

FIG. 1 illustrates an exemplary system 100 that is configured for providing the functionality of a fully distributed transaction settlement system for wireless charging stations. The system may be comprised of any number of participants (e.g., distribution system data centers 101, electric vehicle charging stations 102-105, electric vehicles 102*a/b*, 103*a/b*, 104*a/b*, 105*a/b*, and/or other participants). As depicted in FIG. 1, each participant may be communicatively coupled to each other participant in the system, directly and/or indirectly. For example, electric vehicle charging station 102 may be directly coupled to electric vehicle charging station 103, electric vehicle charging station 104, electric vehicle charging station 105, and distribution data center 101.

Each participant in the system may be associated with one or more databases, computers, servers, and/or other devices that may be mutually connected via the Internet and/or other types of communication networks (e.g., LAN, WAN, VPN, and/or other communication networks). It should be appreciated that any of the computing devices associated with the participants may comprise one or more processors configured to execute software instructions stored on a non-transitory computer readable medium (e.g., hard drive, solid state drive "SSD", RAM, flash memory, and/or any other suitable storage medium) for carrying out the functionality discussed below with respect to the disclosed system.

According to aspects of the disclosure, communication between participants may be conducted according to any number of standardized communication and transaction protocols and/or algorithms (e.g., HTTP, HTTPS, public/private key encryption, web service APIs, FIX, and/or other protocols). The system and methods described herein may, alternatively or in addition to the standardized communication and transaction protocols and/or algorithms, be implemented using any number of proprietary communication and transaction protocols and/or algorithms.

As used herein, the term "computer program" or "software" is meant to include any sequence or human or machine cognizable steps which perform a function. Such program or software may be rendered in any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and/or other machine code implementations.

As used herein, the term "memory" includes any type of integrated circuit or other storage device adapted to store digital information including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Figure 2:
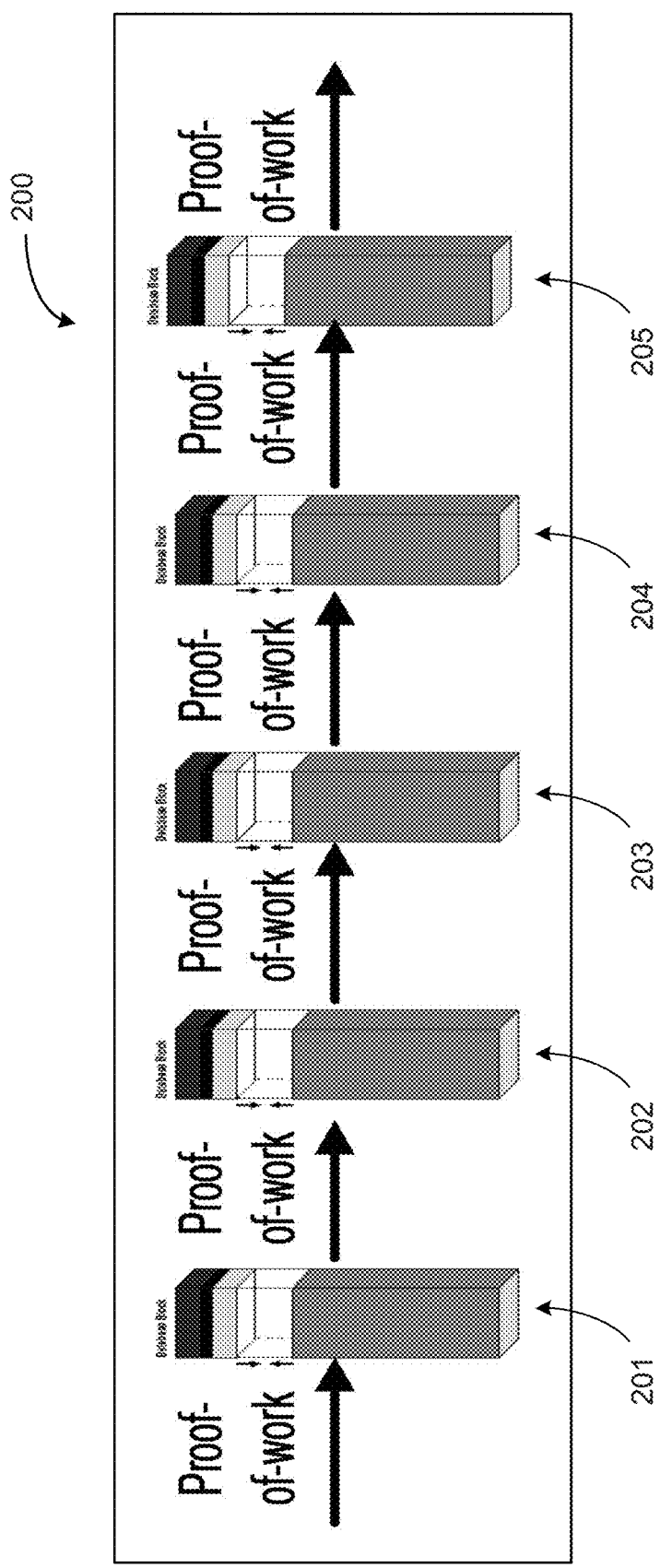
FIG. 2 depicts an exemplary organization of blocks in the block chain according to aspects of the disclosure.

FIG. 2 is an exemplary illustration of a block chain architecture 200 used to carry out the functionality described herein. According to aspects of the disclosure, transactions carried out at the electric vehicle charging stations are recorded as "blocks" 201-205 (i.e., a data structure containing information associated with the transaction). Each new block contains with it as part of its data structure, a cryptographic hash code of the previous block which in effect "chains" it to the previous block, hence the name block chain. The hash code may be generated according to any number of standard cryptographic hash code algorithms or any other technique for generating a hash code. The block chain may contain any number of blocks 201-205 (e.g., transaction data structures).

In the creation of a new block, this new block requires applying proof-of-work ("POW") principles (e.g., incrementing a nonce value until a hash is generated having the desired POW characteristic, for example, a number of leading zero bits or other characteristic), which is easy for other blocks to verify, but extremely time-consuming to generate. Moreover, in order for a new block to be accepted, it has to be verified by other blocks. This organization of data blocks ensures the security of the block chain based transaction settlement. For example, if a hacking entity is to manipulate the information in a particular block, it needs to modify information in this particular block and all subsequent blocks, otherwise such a modification will not be accepted. This difficulty is further increased by the fact that physical units of the blocks are typically geographically separated, and that each block does not contain any information about its successor.

Figure 3:
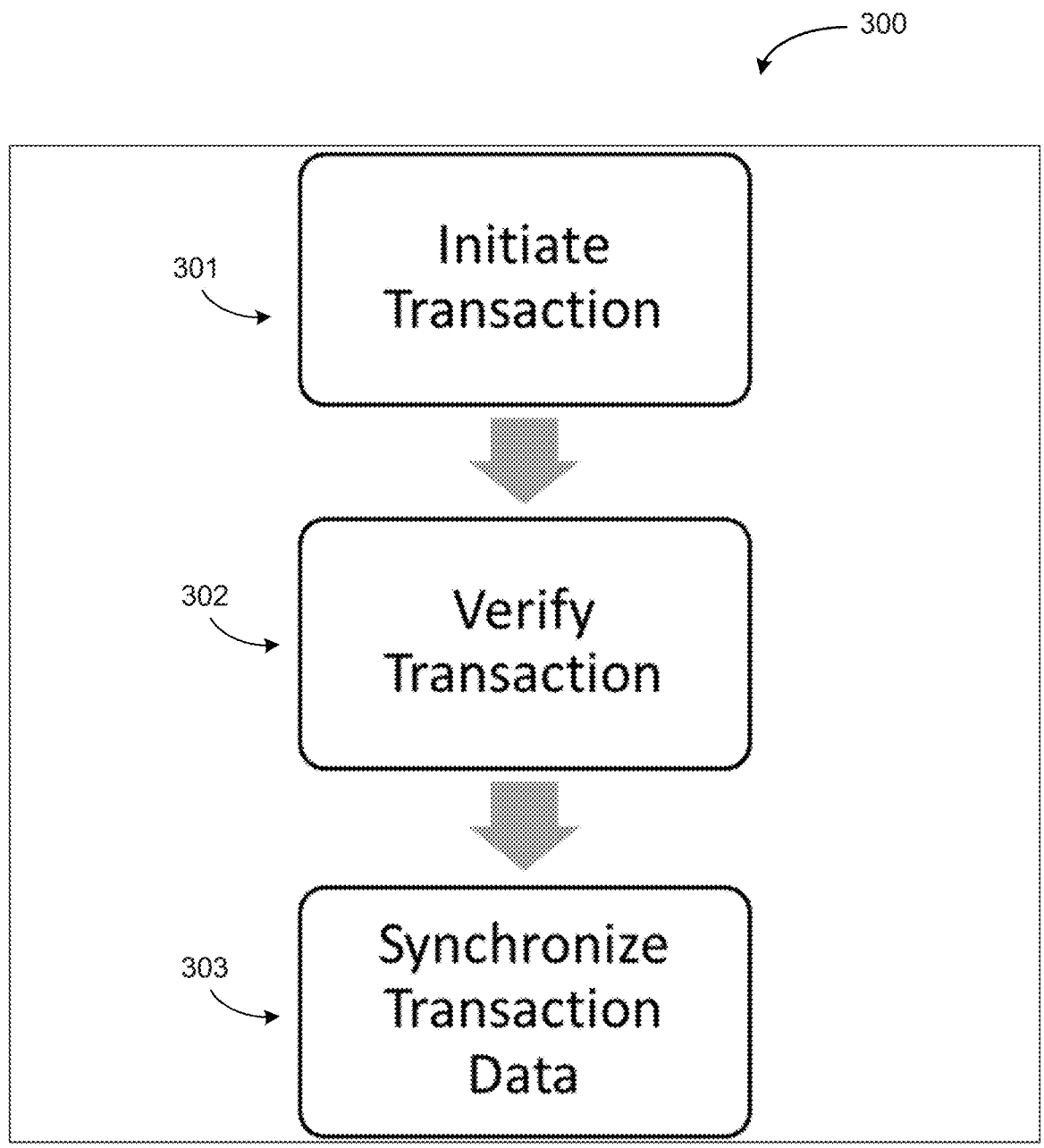
FIG. 3 depicts an exemplary method of conducting a transaction according to aspects of the disclosure.

FIG. 3 illustrates an exemplary method of conducting a transaction 300 using the decentralized transaction settlement system 100 described herein. According to aspects of the disclosure, a transaction may be initiated 301 by an electric vehicle at a charging station. In order to initiate the charging transaction, the electric vehicle sends a digital signature, together with its private key to the wireless charging station. Each electric vehicle has a private key and can use it as its own identity. The digital signature may be generated by software utilized by the system in such a way that together with the private key, this signature can be verified by a so-called "public key". After the transaction initiation, it is broadcast to all wireless charging stations and distribution system data centers for verification.

Following in this exemplary embodiment, the initiated transaction is verified at step 302. Verification is conducted by each participant, e.g., 101-105, in the decentralized transaction settlement system described herein according to any number of POW principles. Each participant (i.e., wireless charging station) has access to a public key that enables them to verify the digital signature when given the private key. Once the transaction (i.e., a block) is verified by all participants in the decentralized transaction settlement system, the procedure moves to step 303, wherein the block is then appended to the chain in a data synchronization procedure. According to aspects of the disclosure, each wireless charging station or distribution system data center can provide record-keeping service for the transaction settlement system. In particular, when a wireless charging station or distribution system data center verifies a recently broadcast transaction, it may record said transaction locally in a database. Moreover, each record-keeping service provider repeatedly collects and verifies newly broadcast transactions, which enables the synchronization of wireless charging data.

Figure 4:
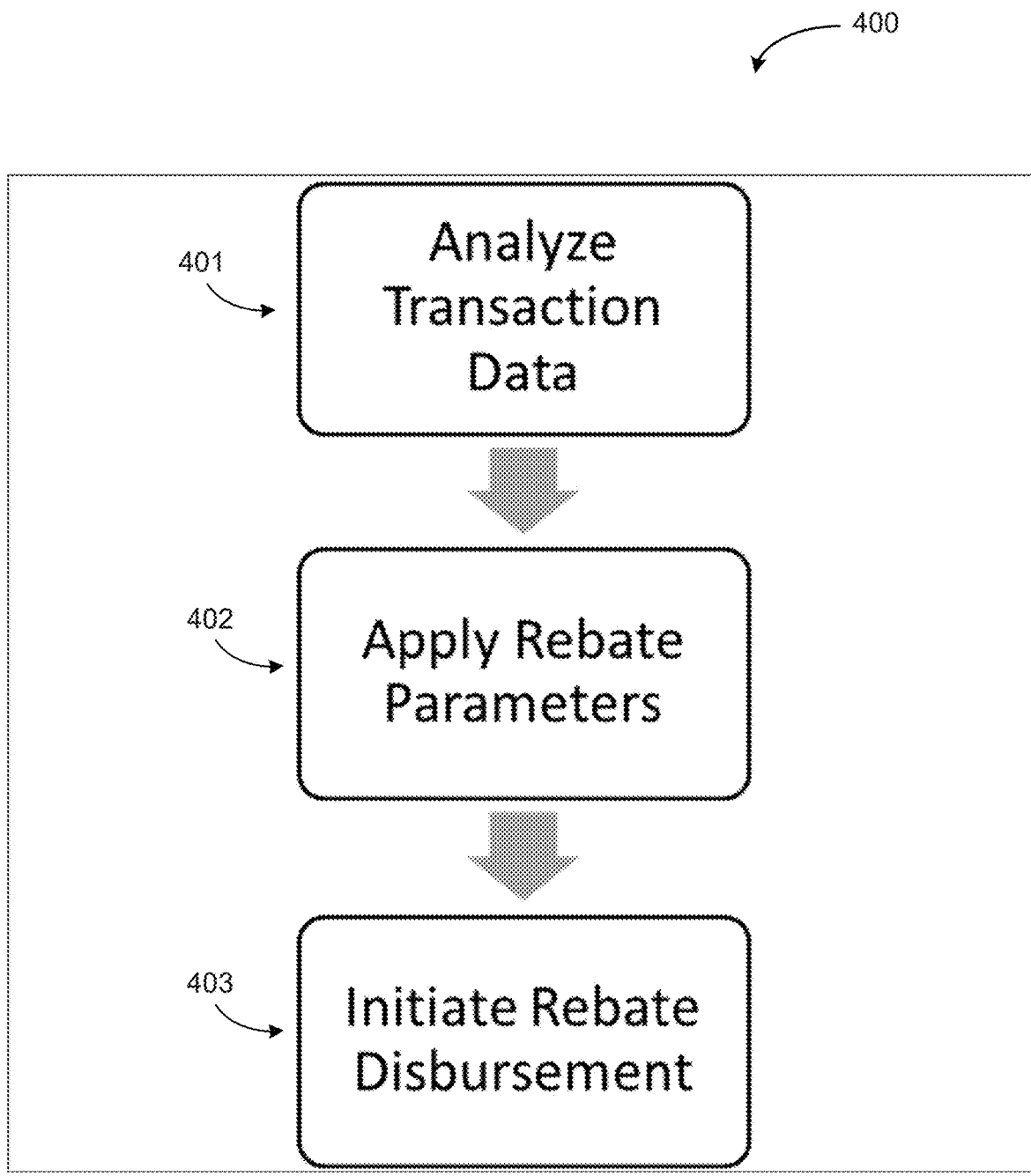
FIG. 4 depicts an exemplary method of providing a rebate to an electric vehicle owner according to aspects of the disclosure.

FIG. 4 illustrates an exemplary implementation of the decentralized transaction settlement system 100 described herein. Here, a process 400 is described to facilitate one or more rebate programs for an electric vehicle charging station owner and/or an electric vehicle owner. At step 401, data blocks aggregated in the block chain may be analyzed to provide a distribution system manager with easily identifiable electric vehicle charging demand data at any location(s). Such rebate program(s) may be based, at least in part, on charging demand and/or parameters (e.g., vehicle age, vehicle cost, location, and/or any other variables), and are then applied at step 402. Once applied, a distribution system manager may initiate a rebate disbursement procedure 403 to dispense rebate funds to an electric vehicle charging station owner and/or electric vehicle owner. According to some aspects of the disclosure, rebate program(s) may be instituted by government entities (e.g., state, local, federal, and/or other governing entities) and/or by the electric vehicle charging station owner. For example, a rebate program for an electric vehicle charging station may be instituted by the federal government to grant a certain amount of funds to the charging station owner according to a first set of parameters associated with the station over a period of time (e.g., aggregate charging demand for one month). Continuing with this example, the charging station owner may further rebate a portion or all of the rebate received from the federal government directly to an individual electric vehicle owner based on a second set of rebate parameters associated with the electric vehicle owner (e.g., aggregate individual charging demand by the electric vehicle owner over the same month).

Rebates may be disbursed in any form of value (e.g., digital currency, fiat currency, gift cards, charging credit, coupon, and/or any other type of rebate) and may be disbursed automatically at any given time.

Figure 5:
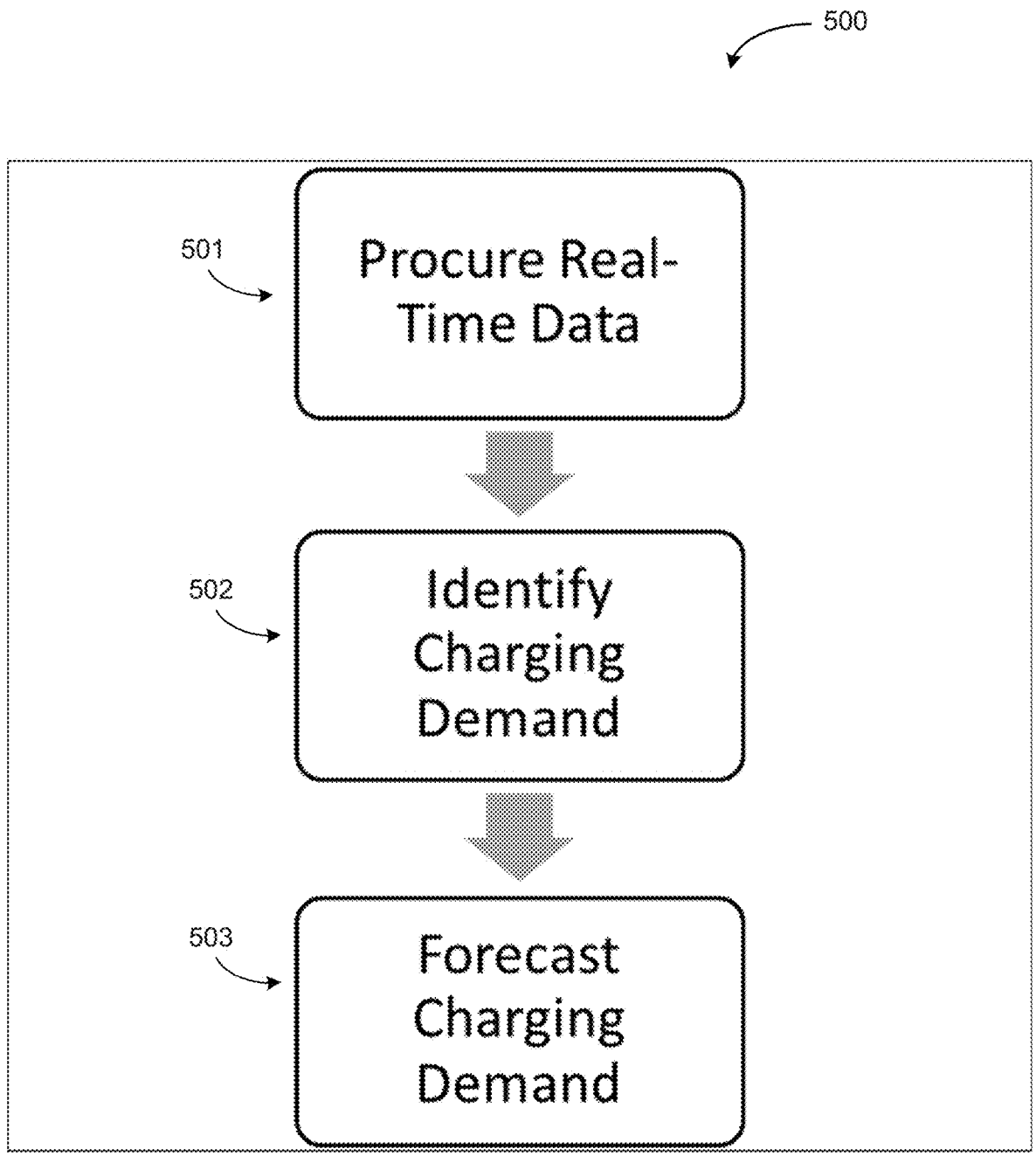
FIG. 5 depicts an exemplary method of providing network load information to distribution network operators according to aspects of the disclosure.

FIG. 5 illustrates another exemplary implementation of the decentralized transaction settlement system 100 described herein. Here, a process is described enabling the real-time monitoring of electric vehicle charging demand 500. Since the distribution system manager can provide record-keeping service (i.e., storing the block chain), from its participation in the decentralized network, it is able to procure real-time electric vehicle charging demand 501 at any given location over any period of time. Such data used to be rarely available for distribution system managers, but is extremely useful for electricity distribution network operators in a smart grid environment. In this process, electricity distribution network operators may be able to utilize the charging data to identify charging demand 502 (e.g., problem areas of high load) in order to design a better, more evenly distributed electricity delivery system and ultimately better serve the network of participants (e.g., the electric vehicle owners). This may be accomplished by utilizing the aggregated real-time data to better forecast 503 charging station demand in a particular area in order to make electricity distribution infrastructure decisions (e.g., new electric vehicle charging station, power supply, and/or other decisions that can be deduced from the data).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A distributed transaction settlement system for wireless charging stations, the system comprising:
   a plurality of electric vehicle charging stations; and
   one or more electricity distribution data centers communicatively coupled to each electric vehicle charging station,
   wherein each electric vehicle charging station is associated with a computing device comprising one or more processors and a non-transitory computer readable medium configured to store one or more data blocks of a block chain, each data block comprising a cryptographic hash code of a previous data block in the block chain, wherein the electric vehicle charging stations are each-communicatively coupled to each other station and configured to:
      receive an electronic signal from an electric vehicle, the electronic signal initiating a request to conduct a transaction;
      broadcast, over a computer network, the electronic signal to each computing device and to the one or more electricity distribution data centers;
      verify, by each computing device and each of the one or more electricity distribution data centers, the electronic signal based on the cryptographic hash code of each data block;
      in response to the electronic signal being verified by each computing device and each of the one or more electricity distribution data centers, record data associated with the transaction as a new data block in the block chain, and
   wherein the one or more electricity distribution data centers are configured to:
      monitor real-time charging demand at each electric vehicle charging station,
   wherein the plurality of electric vehicle charging stations are further configured to:
      store, by a storage electric vehicle charging station of the plurality of electric vehicle charging stations, all the data blocks of the block chain;
      procure, at the storage electric vehicle charging station and based on the data blocks of the block chain, real-time charging demand at each electric vehicle charging station;
      determine, based on the real-time charging demand at each electric vehicle charging station, a rebate disbursement procedure including a first rebate program;
      receive, by a first electric vehicle charging station of the plurality of electric vehicle charging stations, a first rebate amount of the first rebate program, the first rebate amount based on aggregated charging demand associated with the first electric vehicle charging station over a period of time and the real-time charging demand at each electric charging station; and distribute, by the first electric vehicle charging station, a portion of the first rebate amount to the electric vehicle based on aggregated individual charging demand associated with the electric vehicle, the aggregated individual charging demand derived based on the real-time charging demand at each electric vehicle charging station and the aggregated individual charging demand by the electric vehicle over the period of time.

2. The system of claim 1, wherein the electronic signal comprises a private key associated with the vehicle and a digital signature.

3. The system of claim 2, wherein the plurality of electric vehicle charging stations are further configured to verify the electronic signal by using a public key.

4. The system of claim 1, wherein each electric vehicle charging station is further configured to:
broadcast, over the computer network, the electronic signal to a plurality of network participants,
wherein the plurality of network participants include an electric vehicle owner.

5. The system of claim 1, wherein each electric vehicle charging station is further configured to:
broadcast, over the computer network, the electronic signal to a plurality of network participants,
wherein the plurality of network participants include an electric vehicle charging station owner.

6. The system of claim 1, wherein the one or more electricity distribution data centers are further configured to:
aggregate, over the computer network, transaction data stored on the block chain for the first electric vehicle charging station.

7. The system of claim 1, wherein the one or more electricity distribution data centers are further configured to:
forecast charging demand for a future time period based on the monitored real-time charging demand.

8. A method of conducting a transaction in a distributed transaction settlement system for wireless charging stations, wherein the distributed transaction settlement system includes a plurality of electric vehicle charging stations and one or more electricity distribution data centers communicatively coupled to each electric vehicle charging station, each electric vehicle charging station associated with a computing device comprising one or more processors and a non-transitory computer readable medium configured to store one or more data blocks of a block chain, each data block comprising a cryptographic hash code of a previous data block in the block chain, the method comprising:
receiving, by each computing device at an electric vehicle charging station, an electronic signal from an electric vehicle, the electronic signal initiating a request to conduct a transaction;
broadcasting, over a computer network, the electronic signal to each computing device and to the one or more electricity distribution data centers;
verifying, by each computing device and each of the one or more electricity distribution data centers, the electronic signal based on the cryptographic hash code of each data block;
in response to the electronic signal being verified by each computing device and each of the one or more electricity distribution data centers, recording data associated with the transaction as a new data block in the block chain;
monitoring, by the one or more electricity distribution data centers, real-time charging demand at each electric vehicle charging station;
storing, by a storage electric vehicle charging station of the plurality of electric vehicle charging stations, all the data blocks of the blockchain;
procuring, at the storage electric vehicle charging station and based on the data blocks of the block chain, real-time charging demand at each electric vehicle charging station;
determine, based on the real-time charging demand at each electric vehicle charging station, a rebate disbursement procedure including a first rebate program;
receiving, by a first electric vehicle charging station of the plurality of electric vehicle charging stations, a first rebate amount of the first rebate program, the first rebate amount based on aggregated charging demand associated with the first electric vehicle charging station over a period of time and the real-time charging demand at each electric charging station; and
distributing, by the first electric vehicle charging station, a portion of the first rebate amount to the electric vehicle based on aggregated individual charging demand associated with the electric vehicle, the aggregated individual charging demand derived based on the real-time charging demand at each electric charging station and the aggregated individual charging demand by the electric vehicle over the period of time.

9. The method of claim 8, wherein the electronic signal comprises a private key associated with the vehicle and a digital signature.

10. The method of claim 9, wherein verifying the electronic signal is executed using a public key.

11. The method of claim 8, further comprising:
broadcasting, over the computer network, the electronic signal to a plurality of network participants, wherein the plurality of network participants include an electric vehicle owner.

12. The method of claim 8, further comprising:
broadcasting, over the computer network, the electronic signal to a plurality of network participants,
wherein the plurality of network participants include an electric vehicle charging station owner.

13. The method of claim 8, further comprising:
aggregating, over the computer network, transaction data stored on the block chain for the electric vehicle charging station.

14. The method of claim 8, further comprising:
forecasting charging demand for a future time period based on the monitored real-time charging demand.

* * * * *